June 24, 1930.  J. O. OLSEN  1,765,733
POWER DRIVEN SAW
Filed Nov. 20, 1926  2 Sheets-Sheet 1
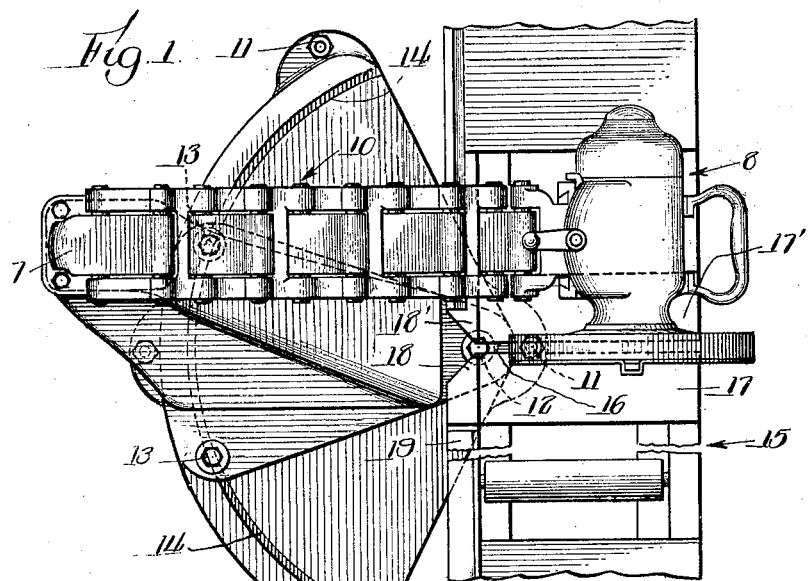
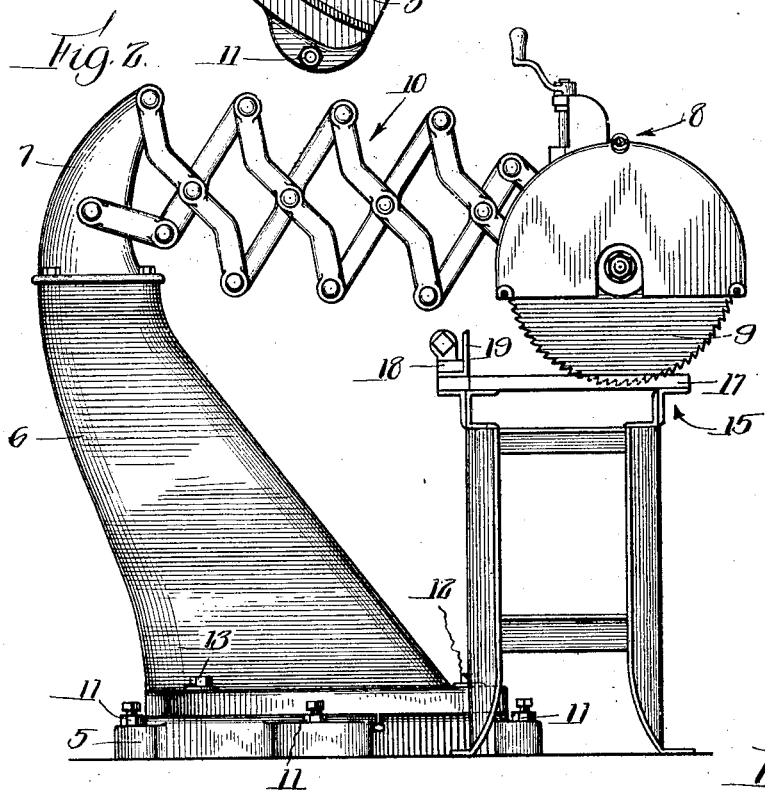
Inventor
Joseph O. Olsen,
By Chindall Parker Karlson
attys June 24, 1930.  J. O. OLSEN  1,765,733
POWER DRIVEN SAW
Filed Nov. 20, 1926   2 Sheets-Sheet 2

Inventor:
Joseph O. Olsen,
By Chindahl Parker Carlson
Attys

Patented June 24, 1930

1,765,733

UNITED STATES PATENT OFFICE

JOSEPH O. OLSEN, ROCKFORD, ILLINOIS, ASSIGNOR TO MATTISON MACHINE WORKS, OF ROCKFORD, ILLINOIS, A CORPORATION OF ILLINOIS

POWER-DRIVEN SAW

Application filed November 20, 1926. Serial No. 149,598.

This invention relates generally to a power driven saw and pertains more particularly to improvements in that type of machine usually designated as a cut-off saw.

This invention has reference to that disclosed in Patent 1,707,764, granted April 2, 1929, to Carl L. Mattison, and has as one object the provision of a new and improved means for adjusting a saw to permit mitre sawing.

Another object of this invention is to provide interchangeable means for supporting the work to be sawed, in which passageways are provided for the saw blade in selectively variable angular relation to the direction of feed of the work.

A further object is to devise a pivotal support for a saw adapted to mitre sawing at selective angles and arranged to effect the entry of the saw into the work at approximately the same point at all angles of sawing.

Further objects and advantages will become apparent from the following description and the accompanying drawings, in which:

Figure 1 is a plan view of the preferred form of the invention in which the saw is set to make a right angled cut across the work table.

Fig. 2 is a side elevation of the invention.

Figure 3:
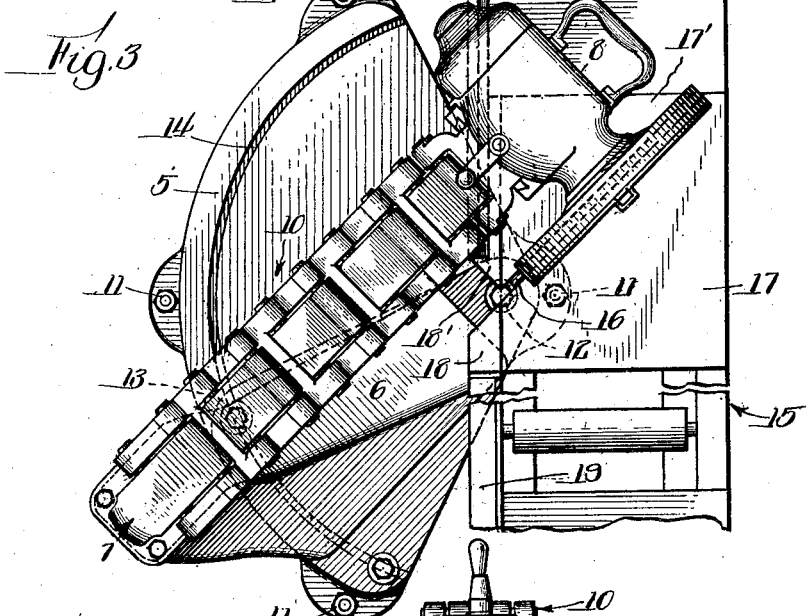
Fig. 3 is a plan view similar to Fig. 1 with the exception that the saw is set to make a mitre cut.

While I have illustrated and described in detail the preferred embodiment of my invention, it should be clearly understood that the disclosure is merely for purposes of illustration and that many modifications and variations will occur to those skilled in the art. I aim in the subjoined claim to cover all such legitimate variations and modifications.

In attaining the objects of this invention, I utilize a support for a saw tool which support is mounted for pivotal adjustment about an axis substantially in alinement with the point at which the saw is desired to first engage the work.

The preferred embodiment of this invention, as depicted in the drawings, comprises a base 5 and a pedestal 6 which has at its upper end a bracket 7 rigidly secured thereto. A motor-driven saw assembly 8 including a saw blade 9 is supported from the bracket 7 by an extensible means, such as a lazy-tongs generally designated as 10, for movement of the saw toward and from the bracket. The general construction of the bracket 7, the saw assembly 8 and the extensible supporting means 10 may be of any preferred type and arrangement, that construction which is herein shown, as well as its mode of operation, being that described at length in the aforesaid copending application.

Figure 4:
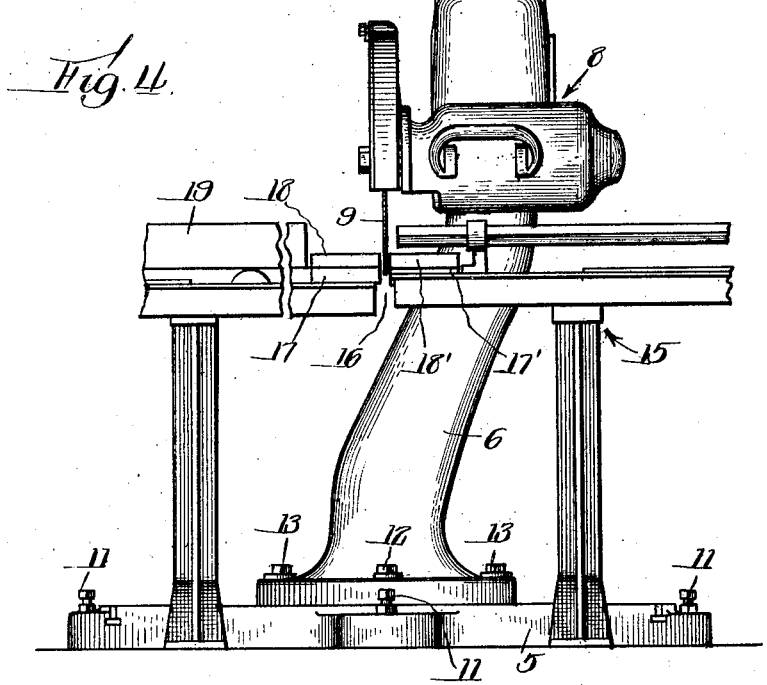
Fig. 4 is a front elevation of the invention.

The means by which I choose to adapt the saw for mitre sawing enables a pivotal swinging movement of the pedestal 6, obtained by pivotally mounting the pedestal upon the base 5. The base 5 comprises any suitably constructed foundation having a plane upper surface, and which preferably may be leveled by means of a plurality of leveling screws 11 positioned about the periphery thereof. The pedestal 6 is secured pivotally at one side of the base by means of a pivot 12 extending through one edge of the pedestal into the base. A pair of bolts 13 positioned substantially at the opposite sides of the pedestal 6 engage an arcuate T-slot 14 extending across the plane surface of the base 5 and serve to lock the pedestal on the base in any desired position. As shown in Figs. 2 and 4, the pedestal slopes rearwardly and to one side, the purpose of which will be hereinafter explained.

A work supporting table, designated as 15 and being of any suitable construction adaptable for this type of machine extends across the front of the pedestal 6 in such position that the saw assembly 8 in its lateral movement to and from the bracket 7 will traverse the surface of the table. A suitable saw-slot 16 to permit passage of the sawblade 9 across the table is provided to avoid possible injury to the sawblade in making a cut. In the present instance, this saw-slot may be positioned at variable angles to accommodate the sawblade at the various angles at which the blade traverses the table in making mitre cuts. A preferred means of accomplishing this variable positioning of the saw-slot comprises a plurality of interchangeable sets of complementary bed blocks 17 and 17', each set of blocks being arranged to provide a different angled saw-slot therebetween. A pair of rear guide blocks 18 and 18' are preferably supported on the rear side portions of the table 15 in such manner as to provide a continuation of a fixed rear work guide 19 secured to the table. The ends of the blocks 18 and 18' are preferably beveled to provide a V-shaped saw-slot therebetween which will permit the passage of the blade for all of the mitre angles possible in the machine. The sets of blocks 17 and 17' may be secured in position by any suitable means permitting them to be readily inserted and removed from the bed of the table.

The pedestal 6 as before stated and shown in Fig. 2 slopes rearwardly from its mounting on the base 5 to permit the saw assembly 8 in the retracted position of the lazy tongs 10 to occupy a position between the bracket 7 and the work table 15. The pedestal slopes to one side, as shown in Fig. 4 a distance sufficient to offset the saw assembly 8 so that the sawblade 9 will, during the reciprocal motion of the assembly, travel in a vertical plane determined by the pivot 12.

An important feature of this invention is the location of the work table 15 with reference to the pedestal 6 and the pivotal point thereof. In order to eliminate adjustments of the bed of the work table 15, it is desirable that the point of first contact (or the point at which the sawblade first engages the work) be constant or fixed for all of the different mitre cuts possible on this machine. The preferred manner in which I have accomplished this purpose is by so positioning the work table with reference to the pedestal that the saw-slot 16, at the point of intersection of the bed blocks 17 and 17' and the rear guide blocks 18 and 18', is approximately alined with the pivotal axis of the pedestal.

This arrangement of the work table 15 and the pedestal 6 insures that the edge of the work will be first engaged by the saw at substantially the same point for all angles of the cut.

In operation the pedestal 6 is first swung to that point which places the saw blade in position to make a cut at any predetermined angle to the table, the pedestal then being secured by tightening the locking bolts 13. The sets of bed blocks 17 and 17' and guide blocks 18 and 18' corresponding to that predetermined angle are then inserted in the bed of the work table 15. It will be readily apparent that I have provided an arrangement whereby the sawblade 9 traveling reciprocally in the vertical plane determined by the pivot 12 and engaging the work at substantially the same point regardless of the angle of the mitre to be made, will produce any desired mitre with a minimum amount of adjustments necessary. Furthermore with a given maximum extension of saw frame the machine, when cutting miters, will be able to saw boards of greater width than if the pivot were positioned some distance behind the front end of the saw slot.

With a machine as disclosed, wherein the position of the saw slot on the rear guide does not change for different angles of miter cutting, the length of the finished work piece may be readily gaged by marks or stops (not shown) positioned along said guide.

I claim as my invention:

A machine of the character described, comprising, in combination, a base having a flat upper surface, an upright pedestal mounted thereon for relative pivotal movement about an axis poistioned adjacent the front side of said base, a work supporting table in front of said pedestal, a work guide on the rear side of said table extending longitudinally thereof, an extensible frame supported on the pivot side of said pedestal for reciprocating movement relative thereto in a horizontal path, and a tool head including a cutting tool carried on the free end of said frame for movement away from and toward said pedestal, said work guide having a transverse slot therein positioned with the work side thereof on the pivotal axis of said pedestal to insure the passage of said cutting tool therethrough at a point definite and fixed for every position of said pedestal relative to said base.

In testimony whereof, I have hereunto affixed my signature.

JOSEPH O. OLSEN.